United States Patent
Ehrlich et al.

(10) Patent No.: US 9,969,439 B2
(45) Date of Patent: May 15, 2018

(54) LOAD-BEARING STRUCTURE OF A MOTOR VEHICLE AND METHOD FOR PRODUCING THE SAME

(71) Applicant: MAGNA STEYR Engineering AG & Co KG, Graz (AT)

(72) Inventors: Philipp Ehrlich, Graz (AT); Manuel Erlacher, Radenthein (AT); Bernhard Hofer, Graz (AT); Reinhard Hoermann, Hitzendorf (AT); Stefan Maier, Lavamuend (AT); Franz Planka, St. Andrae (AT); Michael Rucker, Preding (AT); Stefan Rud, Graz (AT); Anton Spary, Graz (AT); Harald Zachnegger, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days. days.

(21) Appl. No.: 15/393,629

(22) Filed: Dec. 29, 2016

(65) Prior Publication Data

US 2017/0144712 A1 May 25, 2017

Related U.S. Application Data

(62) Division of application No. 14/245,565, filed on Apr. 4, 2014, now Pat. No. 9,567,013.

(30) Foreign Application Priority Data

Apr. 4, 2013 (EP) .................................... 13162270
Jun. 3, 2013 (EP) .................................... 13170282

(51) Int. Cl.
*B62D 27/02* (2006.01)
*B62D 21/09* (2006.01)
(Continued)

(52) U.S. Cl.
CPC .............. *B62D 27/02* (2013.01); *B60R 13/08* (2013.01); *B62D 21/02* (2013.01); *B62D 21/09* (2013.01);
(Continued)

(58) Field of Classification Search
CPC ....... B62D 27/02; B62D 27/06; B62D 27/023
(Continued)

(56) References Cited

U.S. PATENT DOCUMENTS

| 4,355,844 A | 10/1982 | Fantini Muzzarelli |
| 5,228,259 A | 7/1993 | Haddad et al. |

(Continued)

FOREIGN PATENT DOCUMENTS

| AT | 8606 U1 | 10/2006 |
| CN | 1374222 A | 10/2002 |

(Continued)

OTHER PUBLICATIONS

Office Action and Search Report for Chinese Patent Application No. 201410218503.6, dated Nov. 18, 2015, 13 pages including 7 pages of English translation.

(Continued)

*Primary Examiner* — Jason S Morrow
(74) *Attorney, Agent, or Firm* — Jordan IP Law, LLC; Todd A. Vaughn (57) ABSTRACT

A load-bearing structure of a motor vehicle, having hollow profiles and junction elements to connect the hollow profiles. The hollow profiles may be fastened in receptacles of the junction elements, and the junction elements may have a plurality of areal webs in a vehicle vertical direction, at least some of the areal webs forming a framework structure which assists the load path in the respective junction element.

17 Claims, 13 Drawing Sheets

(51) Int. Cl.
  *B62D 27/06* (2006.01)
  *B62D 29/00* (2006.01)
  *F16B 17/00* (2006.01)
  *B60R 13/08* (2006.01)
  *B62D 21/02* (2006.01)
  *B62D 25/02* (2006.01)
  *B62D 25/04* (2006.01)
  *B62D 29/04* (2006.01)

(52) U.S. Cl.
  CPC ........... *B62D 25/025* (2013.01); *B62D 25/04* (2013.01); *B62D 27/023* (2013.01); *B62D 27/026* (2013.01); *B62D 27/065* (2013.01); *B62D 29/008* (2013.01); *B62D 29/048* (2013.01); *F16B 17/004* (2013.01); *Y10T 29/49622* (2015.01); *Y10T 403/472* (2015.01)

(58) Field of Classification Search
  USPC .......... 296/203.01, 205, 203.02, 29; 280/785
  See application file for complete search history.

(56) References Cited

U.S. PATENT DOCUMENTS

| | | | |
|---|---|---|---|
| 5,320,403 A | | 6/1994 | Kazyak |
| 5,343,666 A | | 9/1994 | Haddad et al. |
| 5,947,519 A | | 9/1999 | Aloe |
| 6,296,300 B1 | | 10/2001 | Sato |
| 6,299,240 B1 | | 10/2001 | Schroeder et al. |
| 6,477,990 B2 | | 10/2002 | Panoz |
| 7,322,106 B2 | * | 1/2008 | Marando .............. B22D 19/045 59/507 |
| 7,494,177 B2 | * | 2/2009 | Henning .................. B60P 7/14 296/186.1 |
| 8,210,603 B2 | | 7/2012 | Henning |
| 9,702,391 B2 | * | 7/2017 | Erlacher ................ F16B 13/141 |
| 9,758,193 B2 | * | 9/2017 | Boettcher ............ B62D 25/025 |
| 2004/0119321 A1 | | 6/2004 | Kasuga |
| 2007/0021048 A1 | | 1/2007 | Henning |
| 2007/0051465 A1 | * | 3/2007 | Naughton ............... B29C 65/54 156/305 |
| 2011/0158741 A1 | * | 6/2011 | Knaebel ............... B65D 23/005 403/265 |
| 2011/0241385 A1 | | 10/2011 | Baccouche et al. |
| 2014/0084633 A1 | | 3/2014 | Matsuda et al. |
| 2014/0134361 A1 | * | 5/2014 | Quaderer ............... B62D 27/026 428/34.1 |
| 2014/0301775 A1 | * | 10/2014 | Ehrlich .................. B62D 27/02 400/267 |

FOREIGN PATENT DOCUMENTS

| | | |
|---|---|---|
| CN | 101497347 A | 8/2009 |
| DE | 19603956 A1 | 8/1997 |
| DE | 102006041092 A1 | 3/2008 |
| EP | 0146716 A2 | 7/1985 |
| EP | 0900716 A1 | 3/1999 |
| WO | 90/10797 A1 | 9/1999 |

OTHER PUBLICATIONS

Office Action for U.S. Appl. No. 14/245,565, dated Mar. 18, 2015, 18 pages.
Final Office Action for U.S. Appl. No. 14/245,565, dated Jul. 5, 2016, 15 pages.
Notice of Allowance for U.S. Appl. No. 14/245,565, dated Dec. 8, 2016, 5 pages.

* cited by examiner

LOAD-BEARING STRUCTURE OF A MOTOR VEHICLE AND METHOD FOR PRODUCING THE SAME

CROSS-REFERENCE TO RELATED APPLICATIONS

The present application is a divisional of U.S. patent application Ser. No. 14/219,280 (filed Apr. 4, 2014), now U.S. Pat. No. 9,567,013, which claims priority 35 U.S.C. §119 to European Patent Publication Nos. EP 13162270.6 (filed on Apr. 4, 2013) and EP 13170282.1 (filed on Jun. 3, 2013), which may be hereby incorporated by reference in their respective entireties.

TECHNICAL FIELD

Embodiments relate to a load-bearing structure of a motor vehicle and a method for producing a load-bearing structure. The load-bearing structure has hollow profiles and junction elements, in which the junction elements may be to connect the hollow profiles.

BACKGROUND

Load-bearing structures of a motor vehicle may be used in particular in the so-called "space frame" type of construction of bodies for motor vehicles.

A load-bearing structure composed of light metal cast junctions and/or plastic junctions, and of light metal extruded profiles and/or plastic profiles connecting said junctions, is known, for example, from European Patent Publication No. EP 0900716 A1.

European Patent Publication No. EP 0146716 A2 discloses a car body, in particular for passenger motor vehicles, which as a load-bearing structure comprises pipe parts that may be joined together by way of junction elements, wherein the pipe parts may be extruded profiles produced from light metal, the junction elements may be likewise composed of light metal, and the ends of the extruded profiles may be, owing to their cross-sectional shape, held in positively locking fashion in corresponding receptacles in the junction elements.

SUMMARY

Embodiments relate to enhanced load-bearing structures of motor vehicles, and in particular, to specify a load-bearing structure which is simple and inexpensive to produce, is lightweight yet ensures a high load-bearing capacity.

In accordance with embodiments, a load-bearing structure of a motor vehicle, includes at least one of: hollow profiles and junction elements to connect adjacent hollow profiles by fastening the hollow profiles in receptacles of the junction elements, wherein the junction elements may be extruded, impact-extruded or pultruded parts, each having a plurality of areal webs in a vehicle vertical direction, wherein at least some of the areal webs form a framework structure which assists the load path in the respective junction element.

In accordance with embodiments, the junction elements may be produced by known methods of extrusion, impact extrusion or pultrusion, and accordingly may have a shape that may be produced by such a device/mechanism.

In accordance with embodiments, the junction elements may have a profile composed of areal webs that may be spatially oriented in a common pressing or drawing direction.

In accordance with embodiments, outer delimitations of the junction elements may be also counted among the areal webs that form the respective junction element.

In accordance with embodiments, the areal webs, formed by extrusion, impact extrusion or pultrusion, of the junction elements may be oriented in a vehicle vertical direction in a motor vehicle, wherein a number of such areal webs is arranged so as to jointly form a structure in the manner of a framework. The framework is in this case oriented so as to assist the load path in the junction element.

In this way, it is possible, by way of junction elements which may be relatively easy to produce and lightweight, to construct an extremely stable load-bearing structure, which has a high load capacity, for a motor vehicle.

The production of a load-bearing structure in accordance with embodiments comprises a method in which the junction elements, with their areal webs, may be formed by extrusion, impact extrusion or pultrusion. It is thus possible for multiple such junction elements may be produced, for example, by virtue of the material being pressed or drawn through a die and the junction elements simply being cut to length, that is to say cut off.

In accordance with embodiments, a receptacle of at least one of the junction elements may be formed in the vehicle vertical direction by the areal webs.

In accordance with embodiments, the areal webs that form the receptacle may be arranged parallel and adjacent, on both sides, to at least one wall of the hollow profile fastened in said receptacle. The areal webs of the junction elements may in this case also be utilized to form receptacles for the hollow profiles, and in this case may be arranged on both sides of the hollow profile walls in order to support the walls on both sides.

In accordance with embodiments, adhesive may be introduced between the areal webs that may be arranged parallel and adjacent, on both sides, to at least one wall of the hollow profile fastened in said receptacle. The areal webs then form a region that may be filled with adhesive in order for the hollow profiles may be adhesively bonded to the junction elements.

In accordance with embodiments, one cover may be fastened to the top and/or bottom of the junction elements as viewed in the vehicle vertical direction. The cover serves firstly to stiffen the structure, and secondly forms additional surfaces for the adhesive bonding of received hollow profiles.

In accordance with embodiments, a core is arranged at least in one receptacle of one of the junction elements. The core may have at least one delimiting surface which is arranged substantially parallel and adjacent, at the inside, to at least one wall of the hollow profile fastened in the receptacle. A plurality of delimiting surfaces may be arranged substantially parallel and adjacent, at the inside, to all of the walls of the hollow profile fastened in the receptacle. Such a core is thus arranged, in a receiving region of a junction element, with a spacing to the areal webs of the junction element, such that, onto the core, there may be mounted a hollow profile whose walls may be situated indeed outside the core but within the areal webs of the junction element. The core thus forms further surfaces for the fastening, in particular adhesive bonding, of the hollow profile in the receptacle thereof in the junction element. The core also forms the inner termination of an adhesive bath. The delimiting surfaces may be "substantially parallel" because the delimiting surfaces may also be discontinuous, or may also have a slightly conical form or a porous/perforated surface.

In accordance with embodiments, the core may have a collar which is clamped into the junction element. The core may be fixed in the junction element by way of the collar at least during the fastening of the hollow profile and, depending on requirements, may also remain fastened by way of the collar after the production of the load-bearing structure.

In accordance with embodiments, the core may be formed as a blow-moulded part which, after the curing of the adhesive bath, expands in volume under the action of temperature and thus offers acoustic insulation. Thus, in the cold state, the core forms the termination or the delimitation for the adhesive bath, and owing to expansion of the core (blow-moulded part or foam) under the action of the heat required for the curing process, acoustic insulation of the hollow profile is generated.

In accordance with embodiments, at least one of the junction elements is assembled from at least two junction element parts. In this case, at least one of the junction element parts, or alternatively, all of the junction element parts, may have a framework structure in order to ensure the load-bearing capacity of the junction element. In this way, the production of the junction element may be simplified through the use of smaller and simpler geometries. A junction element assembled in this way may also be easier to repair.

In accordance with embodiments, in a case of assembled junction elements, the junction element parts may be fastened to one another by way of dovetail connection or dovetail-like connections. The fastened surfaces may for example be adhesively bonded to one another.

In accordance with embodiments, the hollow profiles of a load-bearing structure may in particular comprise a pair of A-type pillars. In this way, it is possible to create a three-dimensional load-bearing structure for a motor vehicle.

In accordance with embodiments, the hollow profiles may comprise at least one of a pair of B-type pillars, a pair of sills, a pair of transverse beams, a pair of front longitudinal beams and a pair of rear longitudinal beams.

In accordance with embodiments, at least one of the hollow profiles may be formed as an assembly of multiple extruded profiles, in particular with a tube. For example, A-type pillars and/or longitudinal beams may be in the form of a tube which is clamped and adhesively bonded between multiple extruded profiles. The extruded profiles may likewise be adhesively bonded to one another and additionally mechanically connected, for example, by way of screws, friction stir welding or flow drilling.

In accordance with embodiments, at least one of the hollow profiles may have a profile which is designed for the receipt of a second hollow profile or junction element. Owing to the receipt of a second hollow profile or junction element into a suitably designed profile of a hollow profile, the displacement of an adhesive on the contact surfaces is substantially prevented.

In accordance with embodiments, the junction elements and the hollow profiles may be composed of fibre composite material, aluminium or steel. Junction elements composed of fibre composite material may be produced by deep drawing (pultrusion), whereas junction elements composed of aluminium or steel may be produced by extrusion or impact extrusion.

In accordance with embodiments, a load-bearing structure of a motor vehicle may include at least one of: hollow profiles; and junction elements to connect adjacent hollow profiles, the junction elements having receptacles to which are fastened the hollow profiles, a plurality of areal webs in a vehicle vertical direction, at least some of the areal webs forming a framework structure which assists the load path in a respective junction element.

In accordance with embodiments, a load-bearing structure of a motor vehicle may include at least one of: hollow profiles; junction elements to connect adjacent hollow profiles, the junction elements having receptacles to which are fastened the hollow profiles, a plurality of areal webs in a vehicle vertical direction, at least some of the areal webs forming a framework structure which assists the load path in a respective junction element; an adhesive between the areal webs; and a cover fastened to at least one of a top and a bottom of each junction element when viewed in the vehicle vertical direction.

In accordance with embodiments, a load-bearing structure of a motor vehicle may include at least one of: providing hollow profiles; forming junction elements having receptacles to which are fastened the hollow profiles, a plurality of areal webs in a vehicle vertical direction, at least some of the areal webs forming a framework structure which assists the load path in a respective junction element; and connecting adjacent hollow profiles via the junction elements.

DRAWINGS

Embodiments will be illustrated by way of example in the drawings and explained in the description below.

DESCRIPTION

Figure 1:
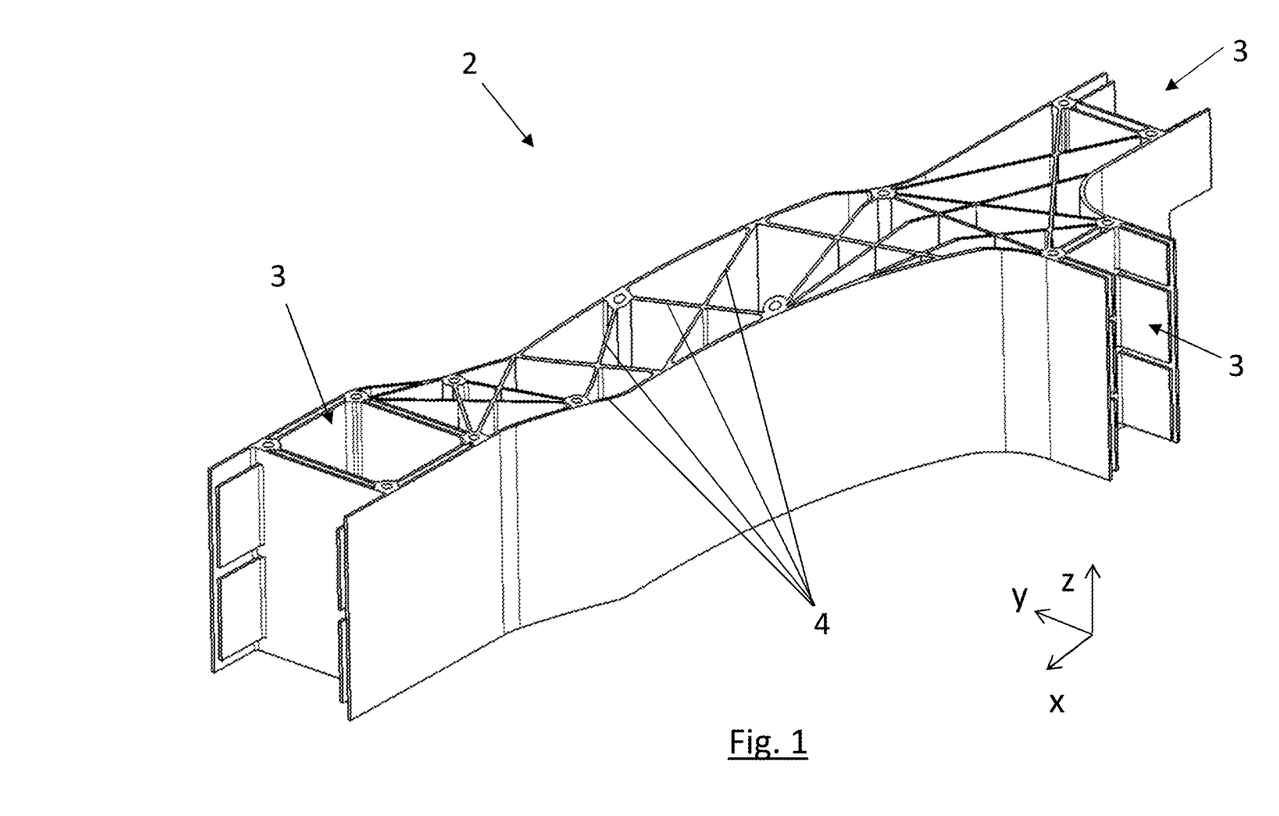
FIG. 1 illustrates a perspective view a junction element of a load-bearing structure, in accordance with embodiments.

As illustrated in FIG. 1, a junction element 2 of a load-bearing structure of a motor vehicle. The junction element 2 may be an extruded or impact-extruded or pultruded part, in each case having a plurality of areal webs 4 in a vehicle vertical direction z.

Figure 3:
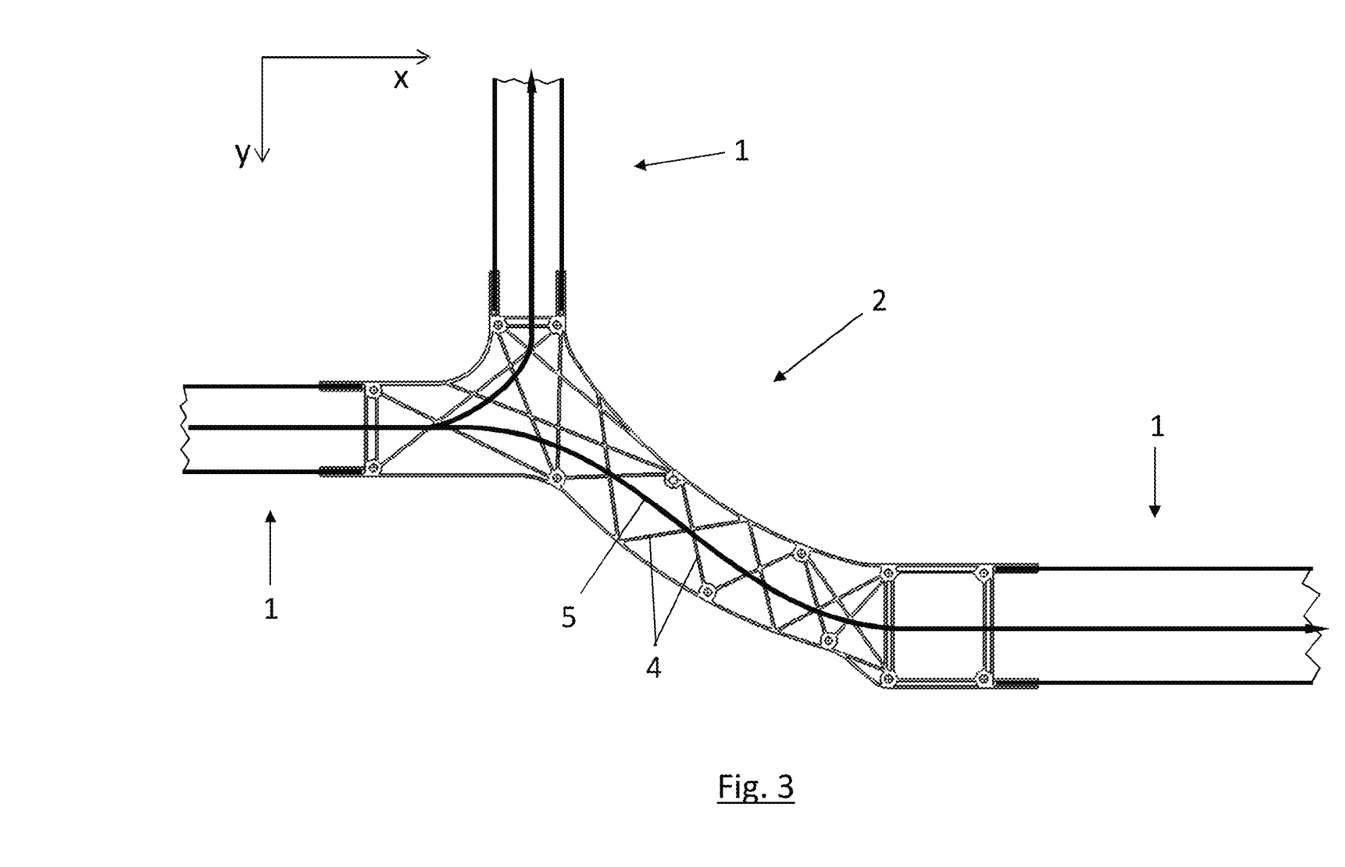
FIG. 3 illustrates the load-bearing structure of FIG. 2a, but with fastened hollow profiles.

As illustrated in FIG. 3, some of the areal webs 4 may form a framework structure which assists the load path 5 in the junction element 2. In addition to the framework structure in the interior of the junction element 2, the areal webs 4 may also form the lateral delimitations of the junction element 2, and receptacles 3 for receiving hollow profiles 1. In a load-bearing structure of a motor vehicle, the illustrated junction element 2 may, for example, be used in structurally identical form as a left-hand and right-hand junction element in the load-bearing structure, produced using an identical extrusion die and handled in mirror-inverted form.

Figures 2A, 2B, 2C:
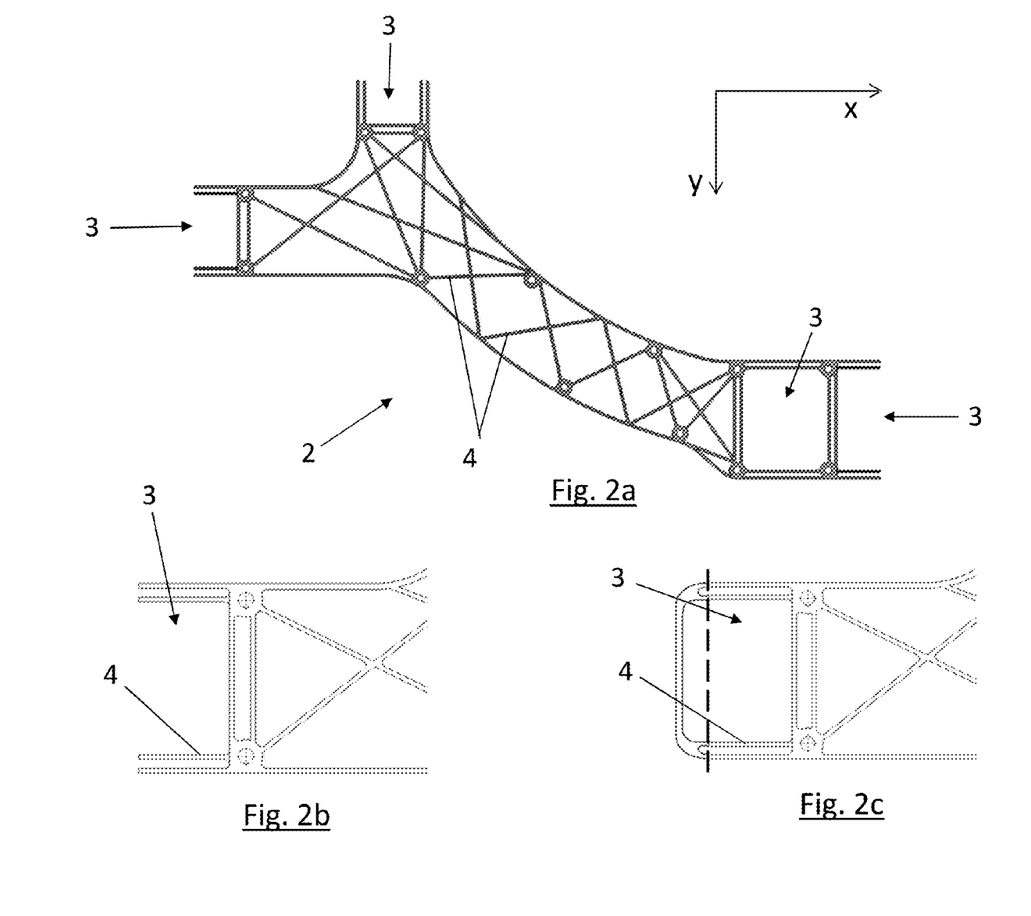
FIGS. 2a to 2c illustrate a top view of the junction element of FIG. 1.

FIGS. 2a to 2c illustrate the junction element 2 of FIG. 1 in a two-dimensional section. The receptacles 3 may be formed by the areal webs 4 of the junction element 2. In each case two areal webs 4 may be designed to engage in parallel, and adjacently on both sides, around walls 6 of a hollow profile 1 fastened in the receptacles. In this regard, see also FIG. 6c.

Figure 6A:
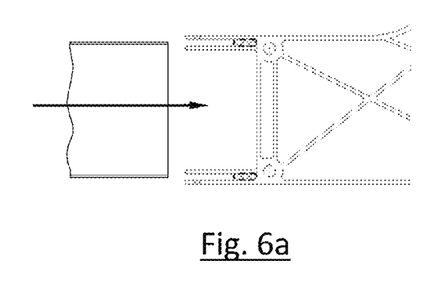
FIGS. 6a to 6c illustrate a top view of a connecting region of the load-bearing of FIG. 3.
Figure 6B:
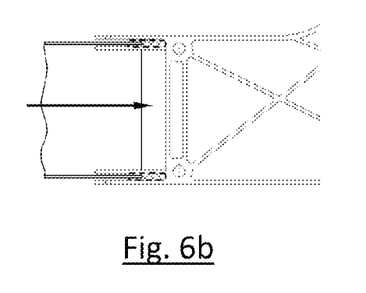
Figure 6C:
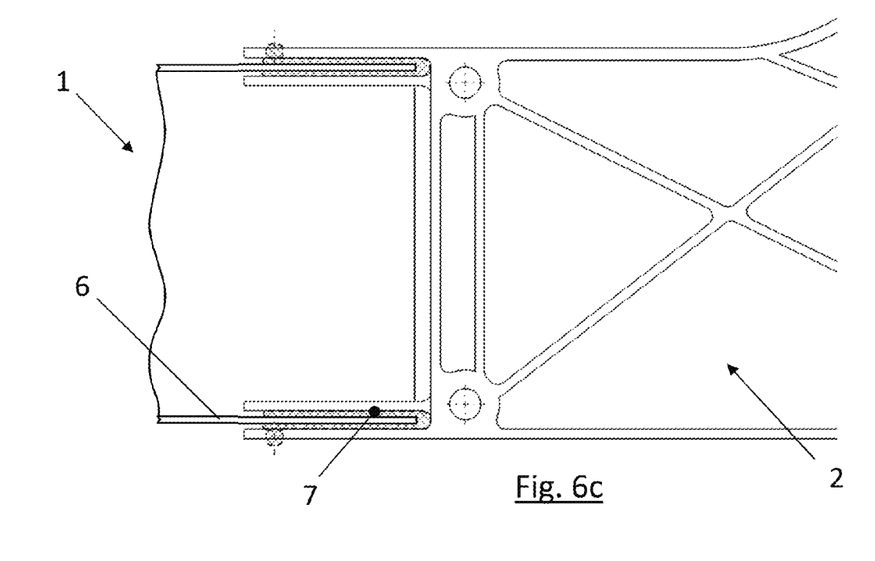

As il FIG. 6c, between the parallel and adjacent areal webs 4 there is in each case one space which, for the fastening of the hollow profiles 1, may be filled with adhesive 7.

As illustrated in FIGS. 2b and 2c, the parallel and adjacent areal webs 4 may be realized in free-standing form already during the extrusion of the component (FIG. 2b), or else may initially be connected by a connecting web which is removed after the extrusion process (FIG. 2c). Better tolerance values at the joining point may be achieved through the retroactive removal of the connecting web.

As illustrated in FIG. 3, in the junction element 2, it is also the case that hollow profiles 1 have been inserted, and preferably adhesively bonded, into the receptacles 3 of the junction element 2. The areal webs 4 may be designed so as to assist the load path 5 in the junction element 2.

Figure 4:
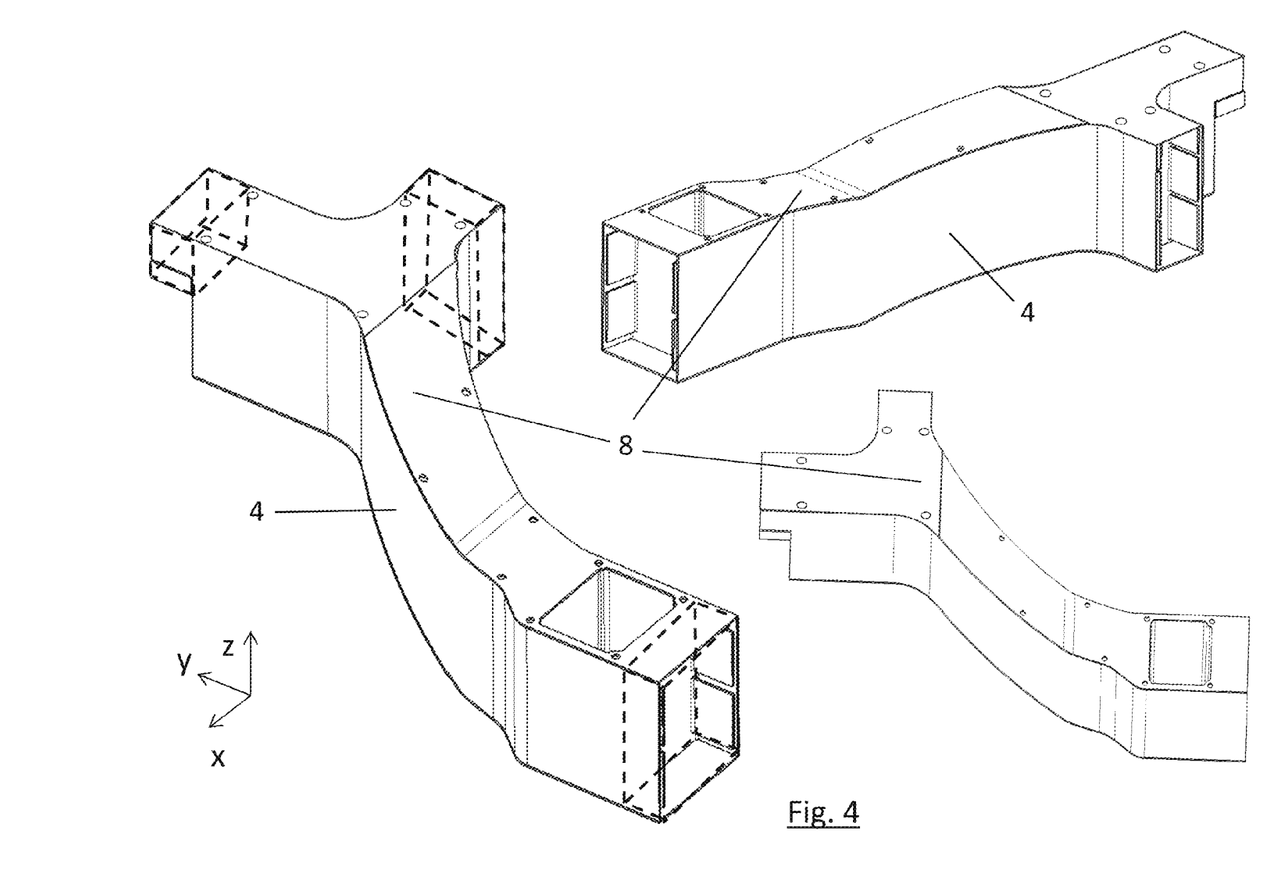
FIG. 4 illustrates the junction element of FIG. 1, but with a cover.

As illustrated in FIG. 4, junction elements 2 in accordance with embodiments may be used in a variety of forms, in particular for different positions within a load-bearing structure. Covers 8 may be fastened normally on the areal webs 4, on the top side and/or on the bottom side of the junction element as viewed in the vehicle vertical direction z, for example by way of so-called flow drilling through core holes of the extruded junction. The covers 8 also serve to close off the receptacles 3 for accommodating an adhesive bath for the fastening of the hollow profiles 1.

Figure 5:
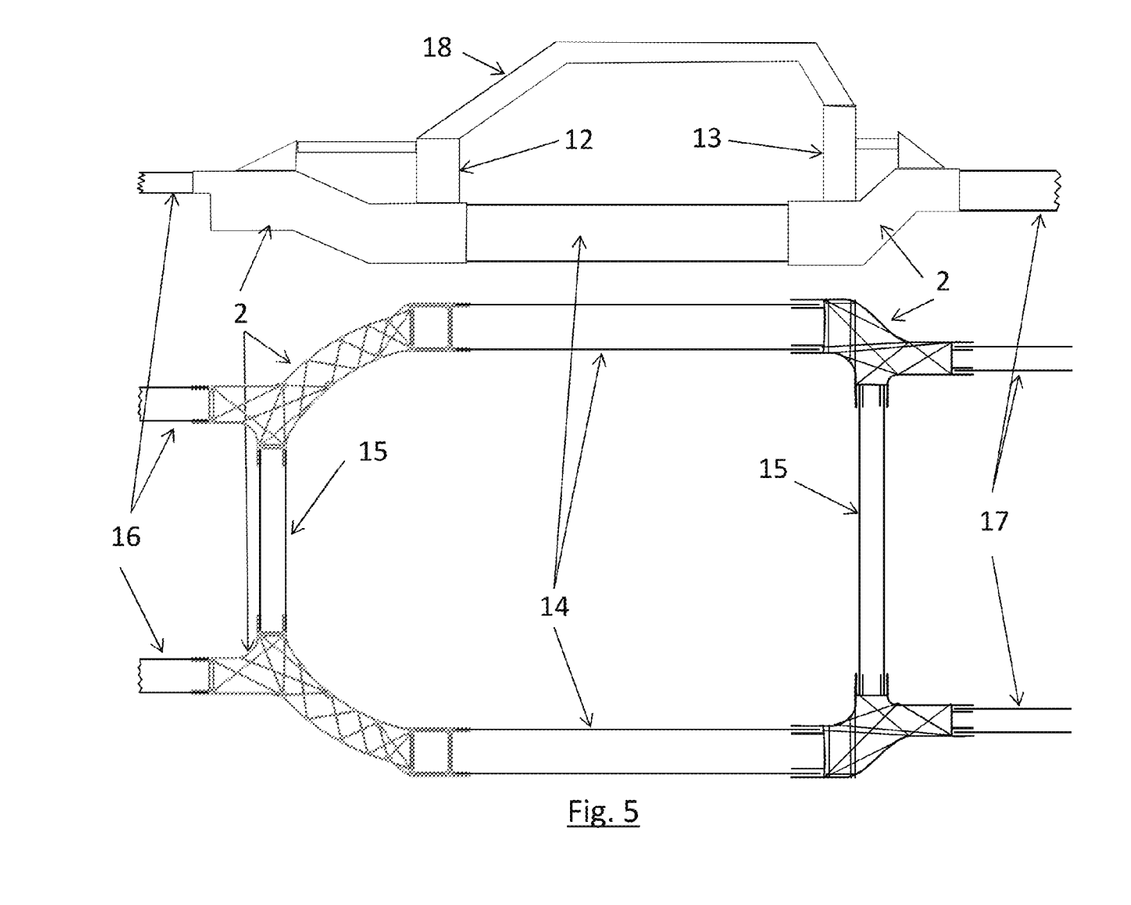
FIG. 5 illustrates a top and side views of a load-bearing structure of a motor vehicle, in accordance with embodiments.

As illustrated in FIG. 5, a complete load-bearing structure of a motor vehicle has at the front and at the rear, right-hand and left-hand, junction elements 2 in each case may be used for the connection of hollow profiles 1. The hollow profiles 1 may be in this case a pair of A-type pillars 12, a pair of B-type pillars 13, a pair of sills 14, a pair of transverse beams 15, a pair of front longitudinal beams 16 and a pair of rear longitudinal beams 17. Here, the sills 14, transverse beams 15 and longitudinal beams 16, 17 may be arranged substantially in a plane, and the A-type pillars 12 and B-type pillars 13 may be arranged substantially perpendicular to said plane, as may be seen in particular in the side view at the top of FIG. 5.

As illustrated in FIGS. 6 and 7, the connection between the hollow profile 1 and junction element 2 is provided in more detail.

As illustrated in FIG. 6a, an adhesive bath may be injected into the receptacle 3 of the junction element 2.

As illustrated in FIGS. 6b and 6b, subsequently, the hollow profile 1 may be arranged or otherwise pushed into the receiving region such that, in the process, the adhesive 7 is displaced and the wall 6 of the fastened hollow profile 1 is wetted from both sides.

Figures 7A, 7B:
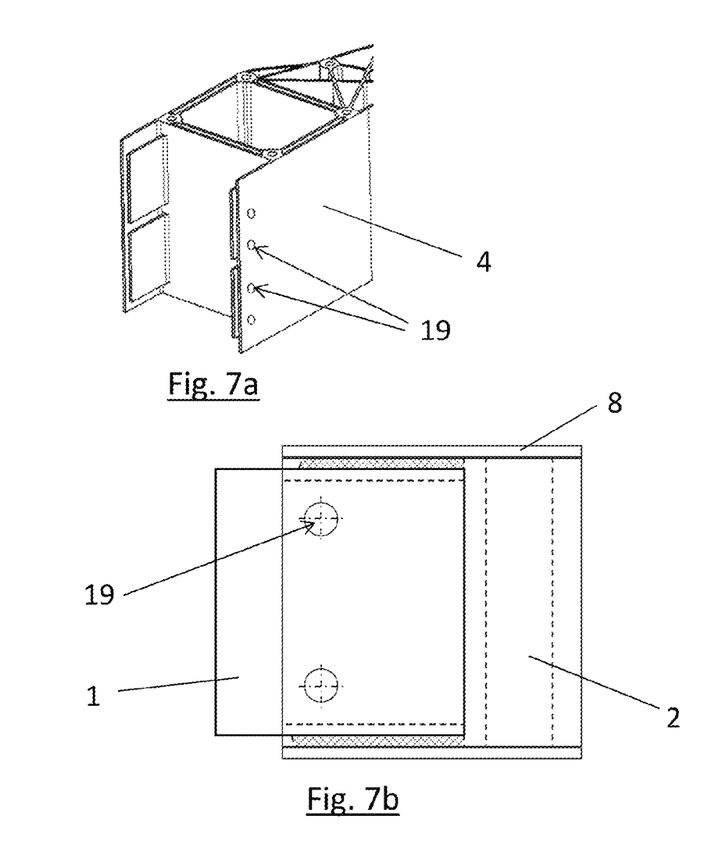
FIGS. 7a and 7b illustrate perceptive and side views of the connecting region of FIG. 6.

As illustrated in FIGS. 7a and 7b, from the escape of adhesive 7 from inspection bores 19, it may be identified whether the component has been adequately wetted and the adhesive connection is acceptable.

Figures 8A, 8B:
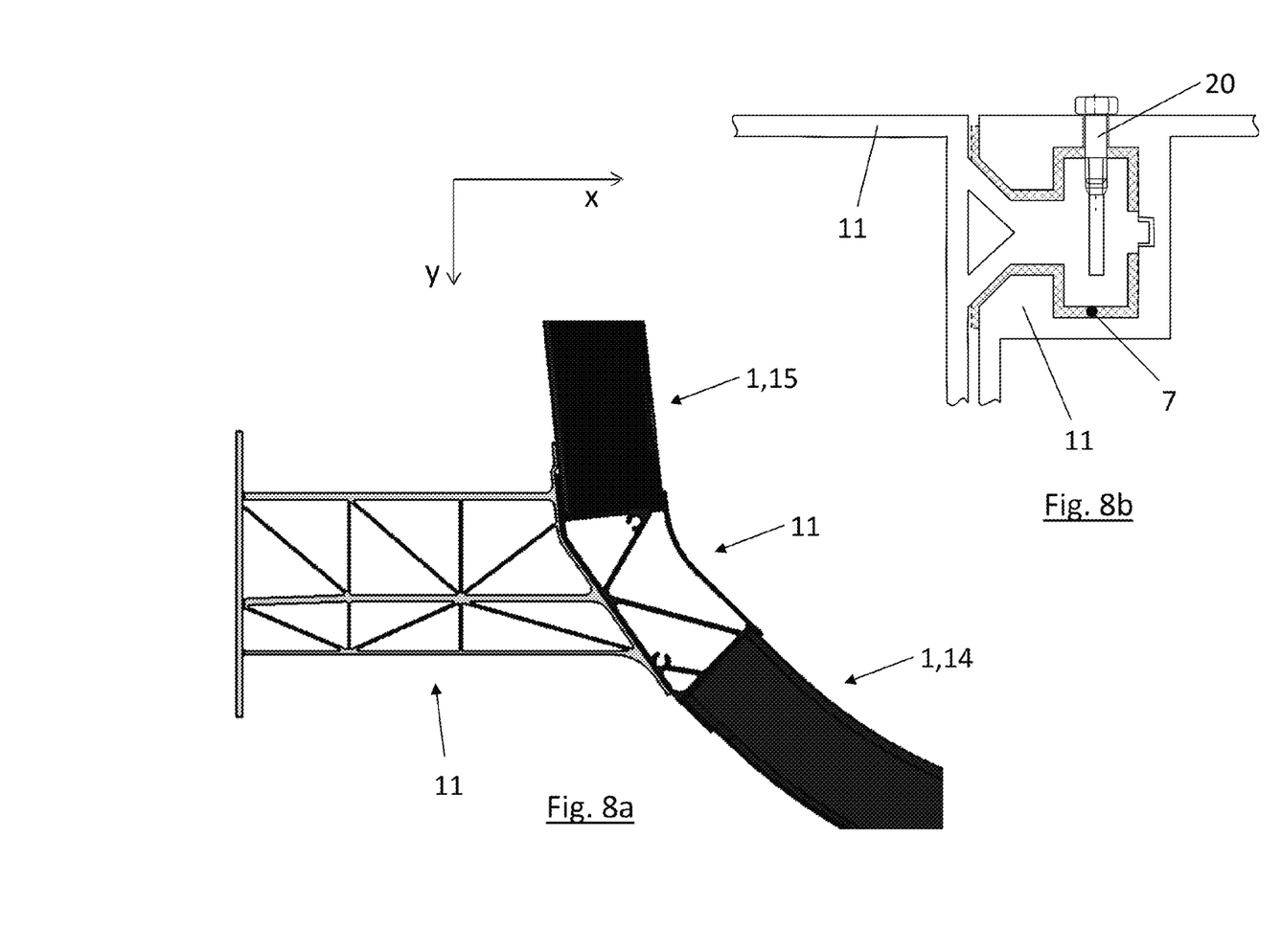
FIGS. 8a and 8b illustrate top and side views of the junction element of FIG. 3.

As illustrated in FIG. 8a, a junction element 2 may also be composed of a plurality of junction element parts 11. It may then be the case that each individual junction element part 11 has a framework structure in accordance with embodiments composed of areal webs 4 in order to assist the load path in the respective junction element part 11. Such a construction composed of a plurality of junction element parts 11 may be produced more easily and is easier to repair. The hollow profiles 1 may for example be a transverse beam 15 and a sill 14. The junction element parts 11 may be connected in a variety of conceivable ways, for example by way of adhesive bonding, screws, friction stir welding etc.

As illustrated in FIG. 8b, the junction element parts 11 may be connected to one another for example by way of a dovetail connection, in which adhesive 7 may be introduced into adhesive gaps, and the components may be held in position at least during the adhesive bonding process mechanically for example, by way of a fixing screw 20.

Figure 9A:
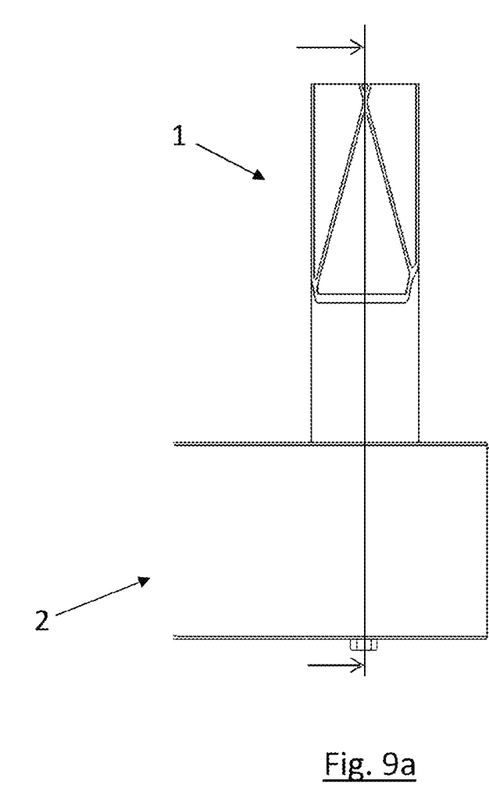
FIGS. 9a and 9b illustrate side views of a connecting region between a hollow profile and a junction element, in accordance with embodiments.
Figure 9B:
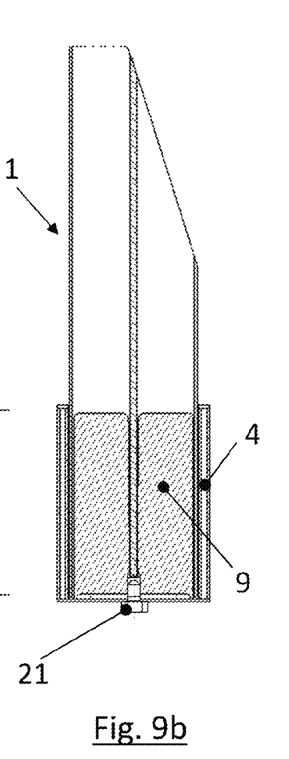

As illustrated in FIGS. 9a and 9b, for the adhesive bonding between a junction element 2 and a hollow profile 1, it may be expedient for additional side walls may be provided in order to provide further predefined spaces for an adhesive bath. The additional walls may be formed by a core 9 which is arranged substantially parallel and adjacent, at the inside, at least to one wall 6, ideally to all of the walls 6, of the hollow profile 1 fastened in the junction element. The core 9 may be arranged in the interior of the junction element 2 such that a receiving space for adhesive 7 and for one or more walls 6 of the hollow profile 1 may be fastened may be created between the core 9 and one or more areal webs 4. It may for example be provided that the core 9 is fixed by way of a centring screw 21 to the lower cover 8 of the junction element 2 only during the adhesive bonding process.

Figure 10A:
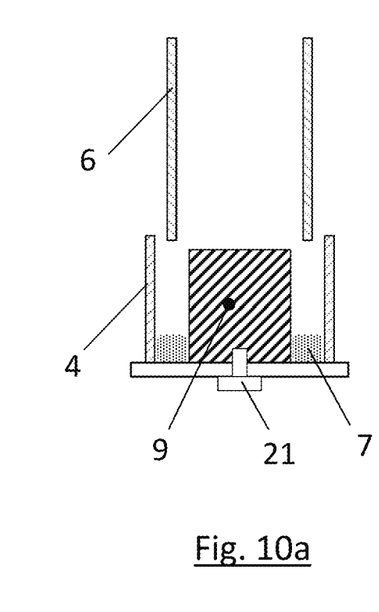
FIGS. 10a to 10c illustrate side views of a connecting region between a hollow profile and a junction element, in accordance with embodiments.
Figure 10B:
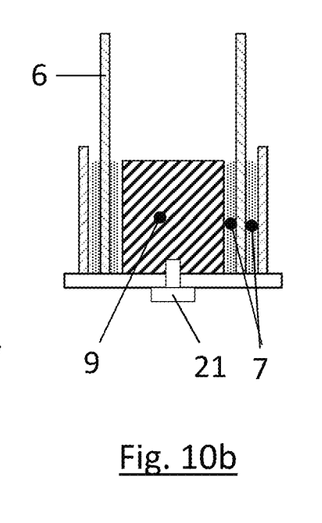
Figure 10C:
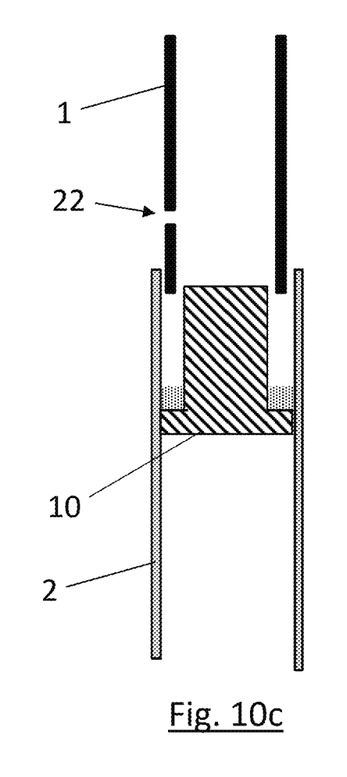

As illustrated in FIG. 10c, alternatively or in addition, the core 9 may also be designed so as to have a collar 10 which is clamped with a slight oversize into the junction element 2 or else into a base hollow profile. In this way, the side walls and the collar 10 of the core 9 again create a space for an adhesive filling, such that the hollow profile 1 may be fastened may be immersed in the adhesive bath. A bore 22 in the hollow profile 1 permits the passage of adhesive 7 for improved hold of the hollow profile 1.

Here, it is also an important function of the core 9 to form the inner termination of the adhesive bath. Furthermore, as a result of the hollow profile 1 or the wall 6 thereof being pressed into the junction element 2, the adhesive 7 swells up to or over the upper edge of the ends of the junction elements 2 owing to the core 9, whereby it is possible to inspect whether sufficient adhesive 7 has been provided and whether the adhesive 7 has also been distributed across the entire connecting surface.

Figure 11A:
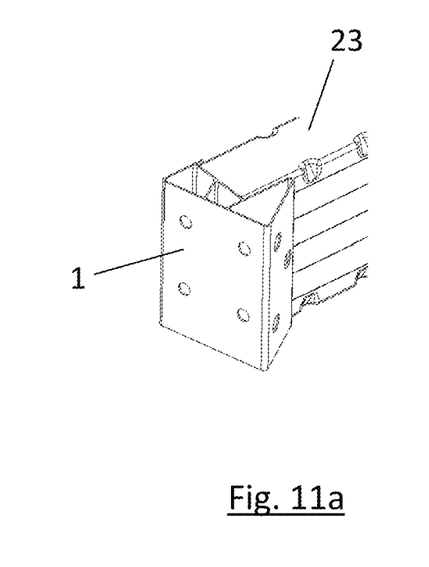
FIGS. 11a and 11b illustrate perspective and plan views of a hollow profile suitable for receipt, in accordance with embodiments.
Figure 11B:
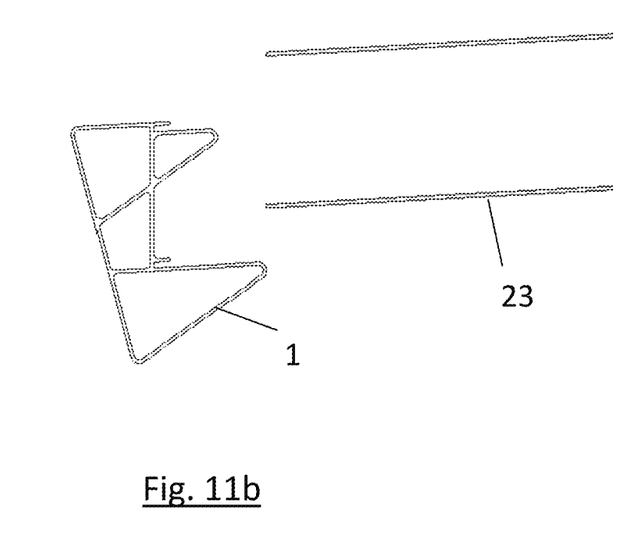

As illustrated in FIGS. 11a and 11b, a hollow profile 1 (in each case on the left in the figures) is suitable for receipt of a second hollow profile 23.

As illustrated in FIGS. 12a to 12d, a second hollow profile 23 (longitudinal profile, on the right in the figures) may be received into the first hollow profile 1 (transverse profile).

Figure 12A:
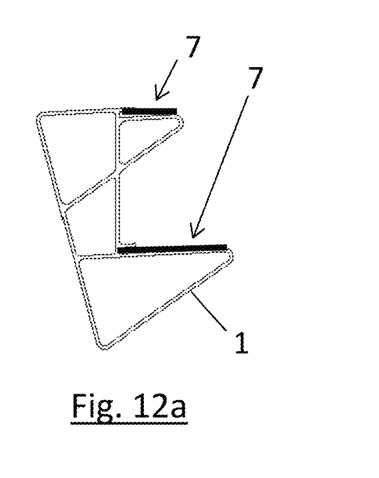
FIGS. 12a to 12d illustrate a method for arranging a further hollow profile (longitudinal profile) into a hollow profile (transverse profile), in accordance with embodiments.
Figure 12B:
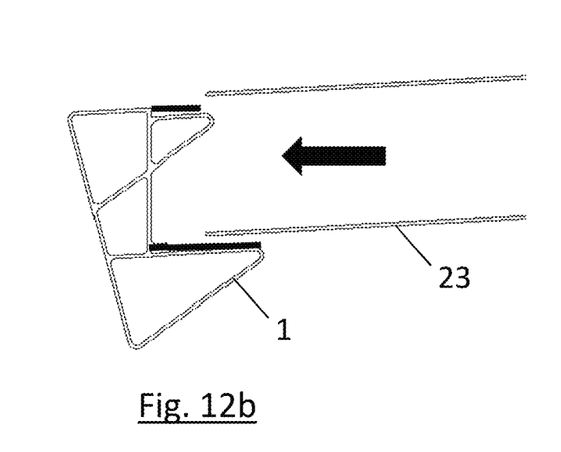

As illustrated in FIG. 12a, structure adhesive 7 is initially applied to the first hollow profile 1. Spaced apart from said first hollow profile 1, a second hollow profile 23 is then moved along closer to the intended contact surface but without coming into contact with, and thus displacing, the adhesive 7.

Figure 12C:
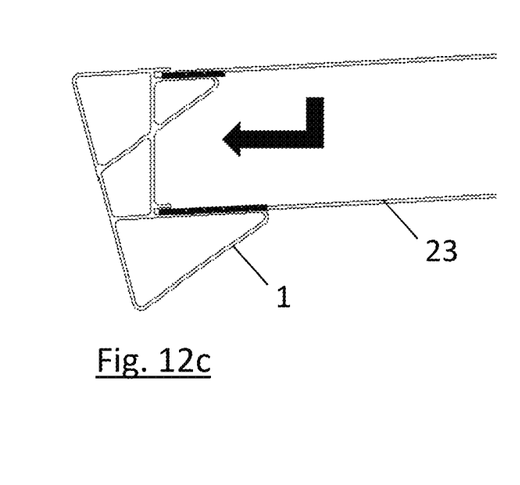

As illustrated in FIG. 12c, the longitudinal profile 23 is, if necessary, set down on the contact surface (arrow direction) in order may be pushed into the groove of the transverse profile 1.

Figure 12D:
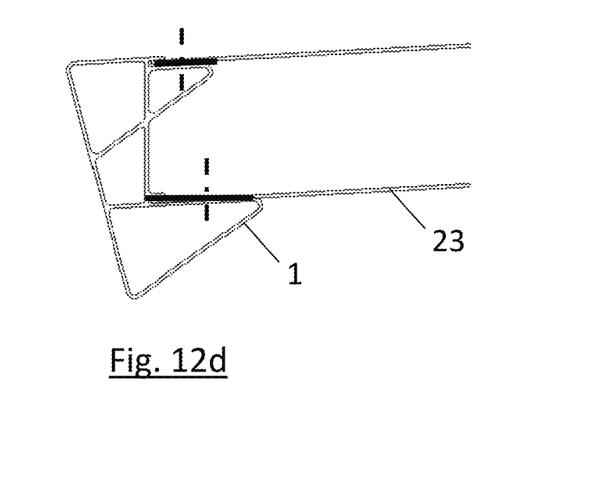

As illustrated in FIG. 12d, in addition to the adhesive 7, it is also possible to use screws, punch rivets and the like, for example, as connecting aids at the positions indicated by dashed lines.

Figures 13A, 13B:
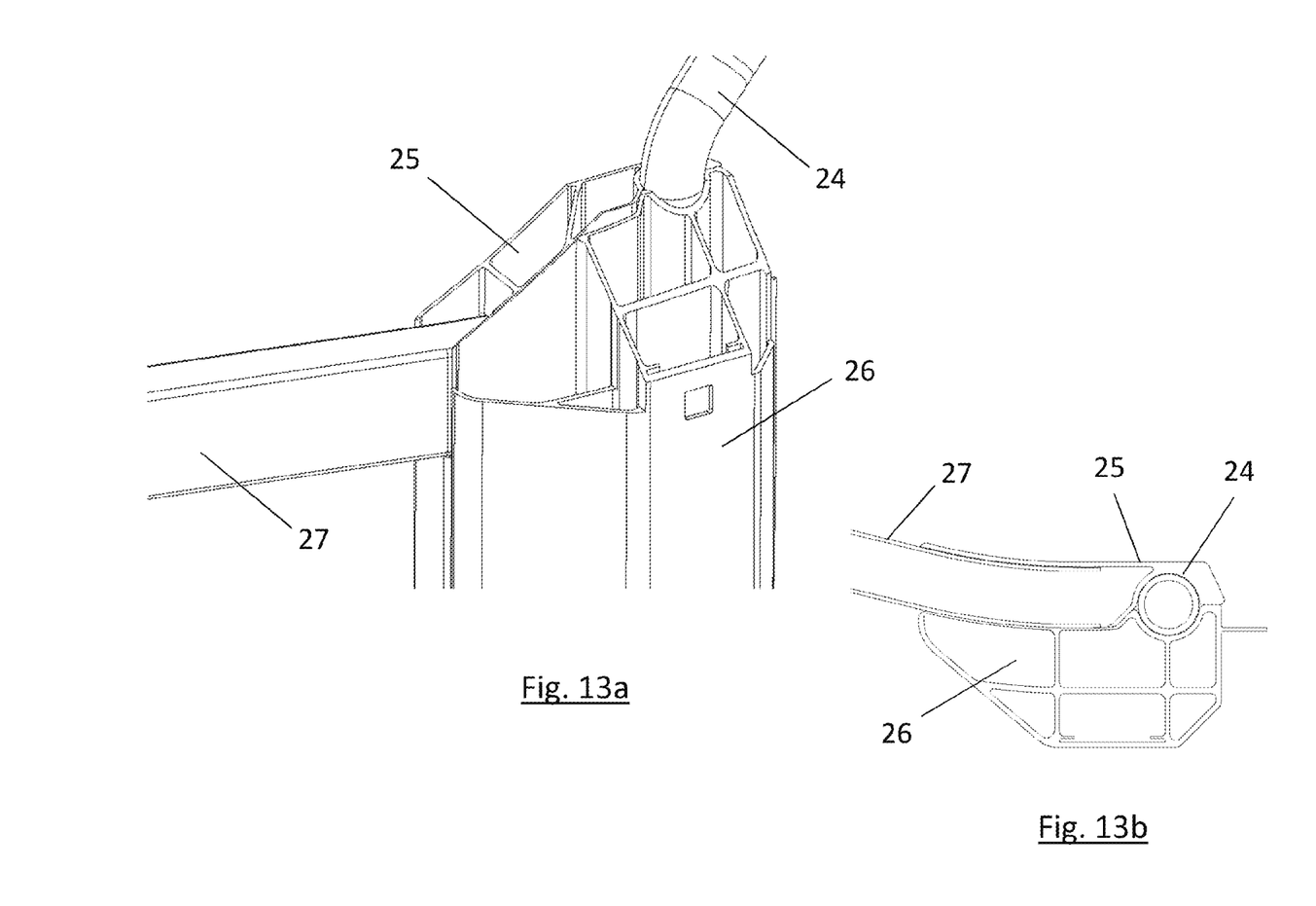
FIGS. 13a and 13b illustrate perspective and plan views of a hollow profile as an assembly of multiple extruded profiles, in accordance with embodiments.

As illustrated in FIGS. 13a and 13b, a hollow profile 1 in the form of an assembly of multiple extruded profiles is provided. Here, a stiffening tube 24 is clamped between an inner extruded profile 25 (inner A-type piller) and an outer extruded profile 26 (outer A-type piller). A front supporting beam 27 is connected to the extruded profile assembly.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Hollow profile
2 Junction element
3 Receptacle
4 Areal webs
5 Load path
6 One wall of the fastened hollow profile
7 Adhesive
8 Cover
9 Core
10 Collar
11 Junction element part
12 A-type piller
13 B-type piller
14 Sill
15 Transverse beam
16 Front longitudinal beam
17 Rear longitudinal beam
18 Roof
19 Inspection bore
20 Fixing screw
21 Centring screw
22 Bore
23 Second hollow profile
24 Stiffening tube
25 Inner extruded profile
26 Outer extruded profile
27 Front supporting beam
x Vehicle longitudinal direction
y Vehicle transverse direction
z Vehicle vertical direction

What is claimed is:

1. A load-bearing structure of a motor vehicle, comprising:
    hollow profiles, at least one of the hollow profiles being formed as an assembly of extruded profiles having a tube clamped and adhesively bonded between the assembly of extruded profiles; and
    junction elements to connect adjacent hollow profiles, the junction elements having receptacles to which are fastened the hollow profiles, a plurality of areal webs in a vehicle vertical direction, at least some of the areal webs forming a framework structure which assists the load path in a respective junction element, wherein at least one receptacle of at least one of the junction elements is formed in the vehicle vertical direction by the areal webs.

2. The load-bearing structure of claim 1, further comprising an adhesive between the areal webs.

3. The load-bearing structure of claim 1, further comprising a cover fastened to at least one of a top and a bottom of each junction element when viewed in the vehicle vertical direction.

4. The load-bearing structure of claim 1, further comprising a core arranged at least in one receptacle of one of the junction elements, the core having at least one delimiting surface which is arranged substantially parallel and adjacent, at an inside, to at least one wall of the hollow profile fastened in the receptacle.

5. The load-bearing structure of claim 4, wherein the core forms an inner termination of an adhesive bath.

6. The load-bearing structure of claim 4, wherein the core comprises a solid body composed of one of aluminum or a foamed material.

7. The load-bearing structure of claim 4, the core comprises a blow-moulded component to acoustically insulate the hollow profiles.

8. The load-bearing structure of claim 4, wherein the core comprises a solid body of a foam material which expands under in response to heat to acoustically insulate the hollow profiles.

9. The load-bearing structure of claim 4, wherein the core has a collar which is clamped into a respective junction element.

10. The load-bearing structure of claim 1, wherein at least one of the junction elements is assembled from at least two junction element parts.

11. The load-bearing structure of claim 10, wherein the junction element parts are fastened to one another by way of a dovetail connection.

12. The load-bearing structure of claim 1, wherein the hollow profiles comprise at least one of A-type pillars, B-type pillars, sills, transverse beams, front longitudinal beams and rear longitudinal beams.

13. The load-bearing structure of claim 1, wherein the junction elements comprise one of a fibre composite material, aluminum and steel.

14. The load-bearing structure of claim 1, wherein at least one of the hollow profiles is formed as an assembly of a plurality of tubes.

15. The load-bearing structure of claim 1, wherein at least one of the hollow profiles has a profile to receive a second hollow profile or junction element.

16. A load-bearing structure of a motor vehicle, comprising:
    hollow profiles, at least one of the hollow profiles being formed as an assembly of extruded profiles having a tube clamped and adhesively bonded between the assembly of extruded profiles;

junction elements to connect adjacent hollow profiles, the junction elements having receptacles to which are fastened the hollow profiles, a plurality of areal webs in a vehicle vertical direction, at least some of the areal webs forming a framework structure which assists the load path in a respective junction element.

17. A load-bearing structure of a motor vehicle, comprising:

hollow profiles, at least one of the hollow profiles being formed as an assembly of extruded profiles that includes an inner extruded profile and an outer extruded profile, and a tube clamped and adhesively bonded between the inner extruded profile and the outer extruded profile;

junction elements to connect adjacent hollow profiles, the junction elements having receptacles to which are fastened the hollow profiles, a plurality of areal webs in a vehicle vertical direction, at least some of the areal webs forming a framework structure which assists the load path in a respective junction element.

\* \* \* \* \*